(12) United States Patent
Toda

(10) Patent No.: US 12,085,752 B2
(45) Date of Patent: Sep. 10, 2024

(54) OPTICAL WAVEGUIDE DEVICE AND OPTICAL INTEGRATED CIRCUIT THAT INCLUDES OPTICAL WAVEGUIDE DEVICE

(71) Applicant: FUJITSU OPTICAL COMPONENTS LIMITED, Kawasaki (JP)

(72) Inventor: Hoshihiko Toda, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 197 days.

(21) Appl. No.: 17/880,261

(22) Filed: Aug. 3, 2022

(65) Prior Publication Data

US 2023/0083232 A1  Mar. 16, 2023

(30) Foreign Application Priority Data

Sep. 10, 2021  (JP) .................................. 2021-148061

(51) Int. Cl.
*G02B 6/125* (2006.01)
*G02B 6/122* (2006.01)

(52) U.S. Cl.
CPC ........... *G02B 6/125* (2013.01); *G02B 6/1228* (2013.01)

(58) Field of Classification Search
CPC ......... G02B 6/125; G02B 6/1228; G02B 6/14
See application file for complete search history.

(56) References Cited

U.S. PATENT DOCUMENTS

| 8,665,514 B2 * | 3/2014 | Nagayasu | ............... H01S 3/067 372/6 |
| 8,737,777 B2 * | 5/2014 | Pitwon | ................... G02B 6/125 385/32 |
| 10,698,157 B2 * | 6/2020 | Pitwon | ............... G02B 6/12002 |

FOREIGN PATENT DOCUMENTS

| JP | 2008-89875 | 4/2008 |
| JP | 2012-68531 | 4/2012 |
| JP | 2014-41253 | 3/2014 |

OTHER PUBLICATIONS

Daoxin Dai et al., "Mode conversion in tapered submicron silison ridge optical waveguides", Optics express, vol. 20, Issue 12, pp. 13425-13439.

\* cited by examiner

*Primary Examiner* — John Bedtelyon
(74) *Attorney, Agent, or Firm* — STAAS & HALSEY LLP

(57) ABSTRACT

An optical waveguide device has a function of removing or suppressing a higher-order mode component of propagating light. The optical waveguide device includes a curved waveguide having a curved shape where a curvature continuously changes. A first waveguide is coupled to one end of the curved waveguide and a second waveguide is coupled to the other end of the curved waveguide. A curvature of the first waveguide and the curvature of the curved waveguide are equal to each other in a coupling point in which the first waveguide is coupled to the curved waveguide, and a curvature of the second waveguide and the curvature of the curved waveguide are equal to each other in a coupling point in which the second waveguide is coupled to the curved waveguide.

18 Claims, 11 Drawing Sheets

A1: DIRECTIONAL COUPLER ILLUSTRATED IN FIG. 4
(WITHOUT MANUFACTURING VARIATIONS)

A2: DIRECTIONAL COUPLER ILLUSTRATED IN FIG. 4
(WITH MANUFACTURING VARIATIONS)

B1: EMBODIMENT ILLUSTRATED IN FIG. 7
(WITHOUT MANUFACTURING VARIATIONS)

B2: EMBODIMENT ILLUSTRATED IN FIG. 7
(WITH MANUFACTURING VARIATIONS)

OPTICAL WAVEGUIDE DEVICE AND OPTICAL INTEGRATED CIRCUIT THAT INCLUDES OPTICAL WAVEGUIDE DEVICE

CROSS-REFERENCE TO RELATED APPLICATION

This application is based upon and claims the benefit of priority of the prior Japanese Patent Application No. 202-148061, filed on Sep. 10, 2021, the entire contents of which are incorporated herein by reference.

FIELD

The embodiments discussed herein are related to an optical waveguide device and an optical integrated circuit including the optical waveguide device.

BACKGROUND ART

Background

In recent years, by requirements for increases in capacity of communication, development has proceeded in optical integrated device small in size and/or allowing high-density integration. In silicon phonics, for example, an optical waveguide formed in a surface region of an SOI (Silicon-On-insulator) wafer. In this case, for example, the core is formed from Si and the clad is formed from SiO2 and the like. Herein, since a difference in refractive index is large between Si and SiO2, light propagating through the optical waveguide is strongly confined within the core. Accordingly, downsizing of the optical waveguide device is actualized.

In silicon phonics, a main factor of propagation loss is caused by roughness of a side wall of the waveguide.

Accordingly, in order to decrease the electric field gathering around the side wall to reduce the propagation loss, in many cases are used optical waveguides with wide widths. In other words, a multi-mode optical waveguide is formed on a substrate. Therefore, in the optical waveguide inside an optical device, not only basic mode light (e.g., TE0) used to carry signals, but also light of other modes (e.g., TE1) propagate.

In addition, a. TE (Transverse Electric) mode is a propagation mode where a main component of the electric field in cross section perpendicular to a propagation direction of light is in the horizontal direction with respect to the substrate. TE0 and TE1 respectively indicate a propagation mode (TE0) with the highest effective refractive index, and a propagation mode (TE1) with the second highest effective refractive index among TE modes. In the following description, TEi (i>0) may be called a "higher-order mode".

When higher-order mode light is input to an optical device, there is the case where an adverse effect occurs. For example, in branching basic mode light using a 1×2 coupler, when the base mode light and higher-order mode light is input to the 1×2 coupler, a part of the input higher-order mode is converted into the basic mode, and interference with the input basic mode occurs. In this case, a branch ratio of the basic mode light deviates from a design value.

Therefore, a method of removing or suppressing the higher-order mode is proposed. For example, in an optical waveguide device where a waveguide capable of guiding two or more modes is connected to a front stage of an optical demultiplexer, proposed is a configuration provided with a mode splitter enabling the modes from the optical waveguide in the front stage of the optical demultiplexer to be separated (e.g., Japanese Laid-open Patent Publication No. 2014-041253 (Japanese Patent No, 5702757)). Further, also in Japanese Laid-open Patent Publication. No. 2012-068531 and Japanese Laid-open Patent Publication No. 2008-089875 are proposed configurations for suppressing higher-order mode components.

For example, the above-mentioned mode splitter is actualized by a directional coupler. The directional coupler includes two optical waveguides (main waveguide and sub-waveguide). Then, by transferring the higher-order mode light propagating through the main waveguide to the sub-waveguide, the higher-order mode component is removed from the main waveguide. However, when structures (e.g., widths) of two optical waveguides are different from each other due to manufacturing variations and the like, a quantity is small in the higher-order mode component transferred from the main waveguide to the sub-waveguide. In other words, it is sometimes not possible to sufficiently remove the higher-order mode component.

Further, according to the configuration of the directional coupler, due to light leakage from the core to the clad, the higher-order mode component transferred from the main waveguide to the sub-waves side sometimes returns to the main waveguide. For example, this problem is relieved by increasing a bent radius of the optical waveguide constituting the directional coupler. In addition, when the bent radius of the optical waveguide is increased, a size of a device (herein, directional coupler) to remove the higher-order mode is increased, and therefore, it is not preferable from a viewpoint of downsizing the optical integrated device.

SUMMARY

According to an aspect of the embodiments, an optical waveguide device has a function of removing or suppressing a higher-order mode component of propagating liqht. The optical waveguide device includes a curved waveguide having a curved shape where a curvature continuously changes. A first waveguide is coupled to one end of the curved waveguide and a second waveguide is coupled to the other end of the curved waveguide. A curvature of the first waveguide and the curvature of the curved waveguide are equal to each other in a coupling point in which the first waveguide is coupled to the curved waveguide, and a curvature of the second waveguide and the curvature of the curved waveguide are equal to each other in a coupling point in which the second waveguide is coupled to the curved waveguide.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
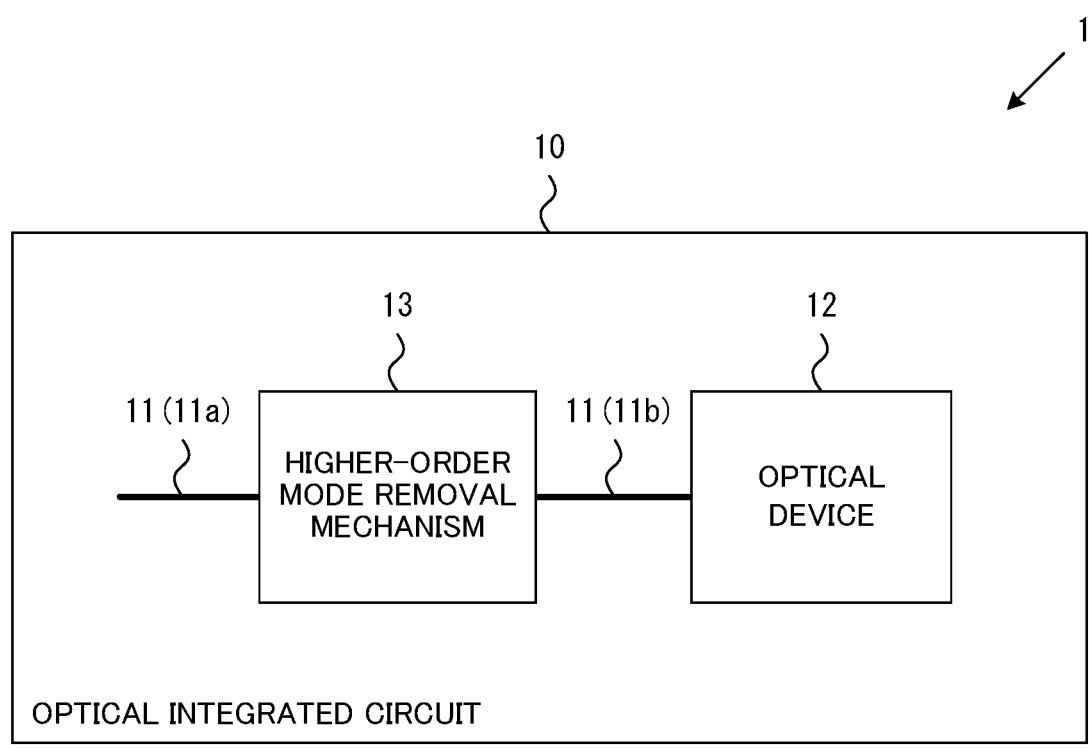
FIG. 1 illustrates an example of an optical integrated circuit according to an embodiment of the present invention.

FIG. 1 illustrates an example of an optical integrated circuit according to an embodiment of the present invention. An optical integrated circuit 1 according to the embodiment of the present invention is formed on a surface of a substrate 10. The substrate 10 is not limited particularly, and for example, is an SOI (Silicon-On-Insulator) substrate. In this case, for example, a core of an optical waveguide is formed from Si and a clad is formed from SiO2 and the like.

The optical integrated circuit 1 includes optical waveguides 11 (11a, 11b) and optical device 12. The optical waveguide 11 guides input light to the optical device 12. Herein, in order to decrease the propagation loss on the substrate 10, it is preferable to widen a width of the optical waveguide. However, when the width of the optical waveguide is widened, the waveguide propagates not only basic mode light (e.g., TE0) used to carry signals, but also higher-order mode light (e.g., TE1).

The optical device 12 is not limited particularly, and for example, is a 1×2 optical coupler. The 1×2 optical coupler is capable of branching input light. In other words, it is possible to use the 1×2 optical coupler as an optical splitter for branching input light at a specified branch ratio. However, when the input light includes higher-order mode components, the branch ratio of the 1×2 optical coupler may deviate from a target value.

Figure 2A:
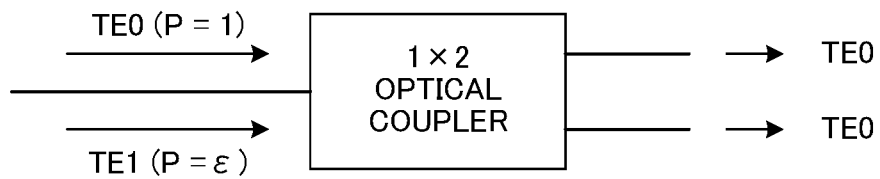
FIGS. 2A and 2B are diagrams to explain an effect of a higher-order mode.
Figure 2B:
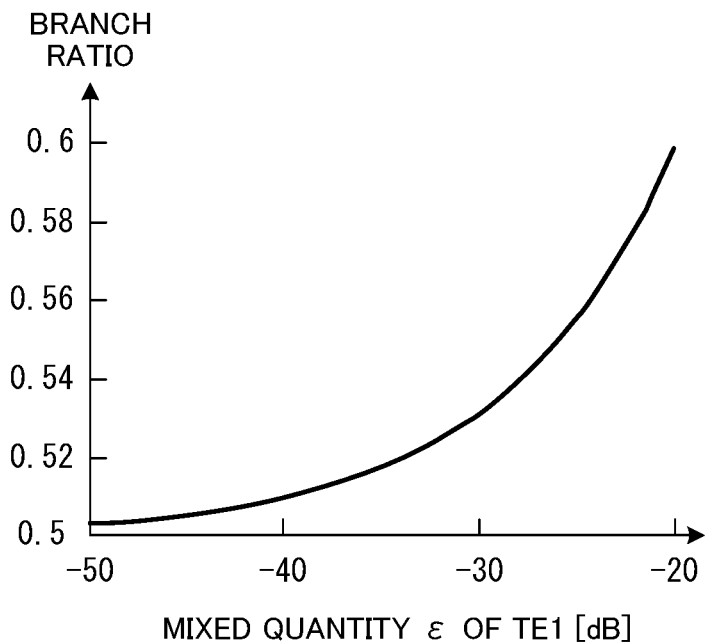

FIGS. 2A and 2B are diagrams to explain an effect of the higher-order mode. In this case, as illustrated in FIG. 2A, input light is branched by the 1×2 optical coupler. Note that TE0 mode light and TE1 mode light are input to the 1×2 optical coupler. It is assumed that input power of the TE1 mode light is "ε", when input power of the TE0 mode light is "1". In addition, it is assumed that the 1×2 optical coupler is designed so that the branch ratio is 50:50 when the TE1 mode light does not exist.

When the TE0 mode light and TE1 mode light are input to the 1×2 optical coupler, a part of the TE1 mode is converted into the TE0 mode, and interference occurs between the input TE0 mode and the TE0 mode generated by conversion, and exerts an effect on the branch ratio of the TE0 mode 11a ht. Specifically, as illustrated in FIG. 2B, when input power ε of the TE1 mode light is small, the branch ratio is about 0.5 (i.e., 50:50). In contrast thereto, when the input power ε of the TE1 mode light increases, the branch ratio deteriorates to about 0.6 (i.e., 60:40). When the branch ratio deviates from the target value, quality of optical signals may deteriorate. For example, in the case where an optical modulator is provided with a Mach-Zehnder interferometer and input. CW light is branched by the 1×2 optical coupler and guided to an I arm and Q arm of the Mach-Zehnder interferometer, an extinction ratio is poor in an optical signal generated by the optical modulator.

As another case, the optical device 12 may include a tapered waveguide to change a width of the optical waveguide. For example, the tapered waveguide is provided between two optical waveguides with different widths. In an example illustrated in FIG. 3A, the tapered waveguide is provided between an optical waveguide 21 and an optical waveguide 22.

Figure 3A:
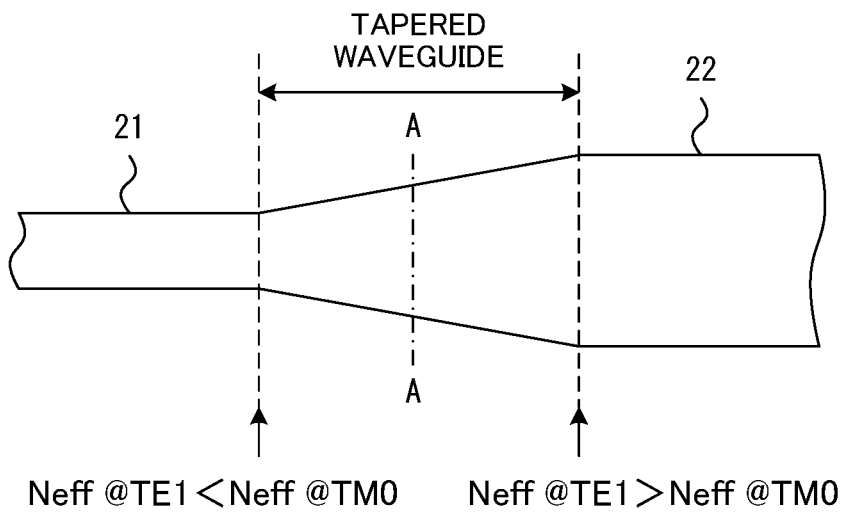
FIGS. 3A and 3B illustrate an example of a tapered waveguide.
Figure 3B:
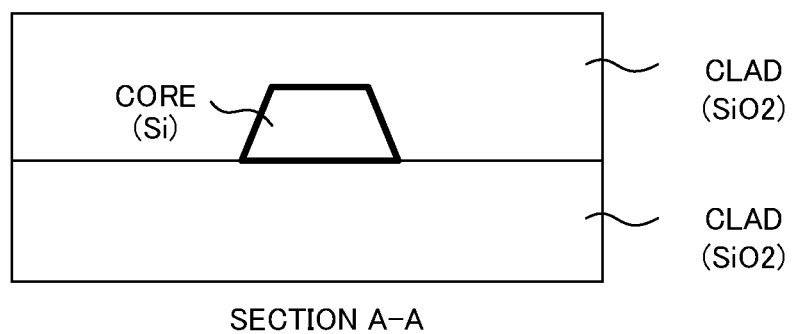

As illustrated in FIG. 3A, the tapered waveguide is formed so that a width of the core continuously changes in a propagation direction of light. Further, as illustrated in FIG. 3B, a cross-sectional shape of the core of the tapered waveguide is asymmetry in the direction perpendicular to the substrate with the tapered waveguide formed. Specifically, the width of a lower end portion is wider than the width of an upper end portion of the core.

When a higher-order mode component (TEm (m≥1)) of the TE mode is input to the tapered waveguide with the above-mentioned configuration, the TEm mode component may be converted into a TMn(n≥0) mode component. Specifically, when two conditions described below are met, the TEm mode is converted into the TMn(n≥0) mode. The case of m=1 will be described below, but the case of m>2 is the same.

Condition 1: Level relationships between effective refractive index Neff@TM0 of the TM0 mode and effective refractive index Neff@TE1 of the TE1 mode are mutually opposite between an input end and an output end of the tapered waveguide.

Condition 2: In the direction perpendicular to the substrate with the tapered waveguide formed, the distribution of the refractive index is asymmetry inside cross section of the tapered waveguide.

Herein, the condition 1 includes the following two cases.

(1) When the effective refractive index Neff@TM0 is larger than the effective refractive index Neff@TE1 in the input end of the tapered waveguide, the effective refractive index Neff@TM0 is smaller than the effective refractive index Neff@TE1 in the output end.

(2) When the effective refractive index Neff@TM0 is smaller than the effective refractive index Neff@TE1 in the input end of the tapered waveguide, the effective refractive index Neff@TM0 is larger than the effective refractive index Neff@TE1 in the output end.

The condition 1 may be satisfied according to the shape of the tapered waveguide. Further, the condition 2 is actualized by the cross-sectional shape of the core of the tapered waveguide. Note that, for example, mode conversion the tapered waveguide is described in Daoxin Dai et al., Mode conversion in tapered submicron silicon ridge optical waveguides. Optics Express, Vol. 20, Issue 12, pp. 13425-13439.

When TM0 mode light is generated from TEm mode light in the tapered waveguide, the quality of the optical signal may deteriorate. For example, in polarization multiplexing communication using the TE mode and TM mode, since interference occurs between the TM0 mode light for carrying the signal and the TM0 mode light generated in the tapered waveguide, due to crosstalk between polarization, the quality of the polarization multiplexed optical signal may deteriorate.

As described above, when the higher-order mode light input to the optical device 12, the quality of the optical signal sometimes deteriorates. Thus, the optical integrated circuit 1 is provided with a higher-order mode removal mechanism 13 on the input side of the optical device 12. Specifically, the higher-order mode removal mechanism 13 removes the higher-order mode component propagating through the optical waveguide 11. Note that, in the following description, an optical waveguide coupled to an input side of the higher-order mode removal mechanism 13 may be called "input waveguide 11a". Further, an optical waveguide coupled to an output side of the higher-order mode removal mechanism 13 may be called "output wayguide 11b".

When basic mode light (TE0) and higher-order mode light (TEm (m≥1)) propagates via the optical waveguide 11, the higher-order mode removal mechanism 13 removes the higher-order mode light. Note that, in the following description, it is assumed that "removal" includes a function for suppressing higher-order mode component.

Figure 4:
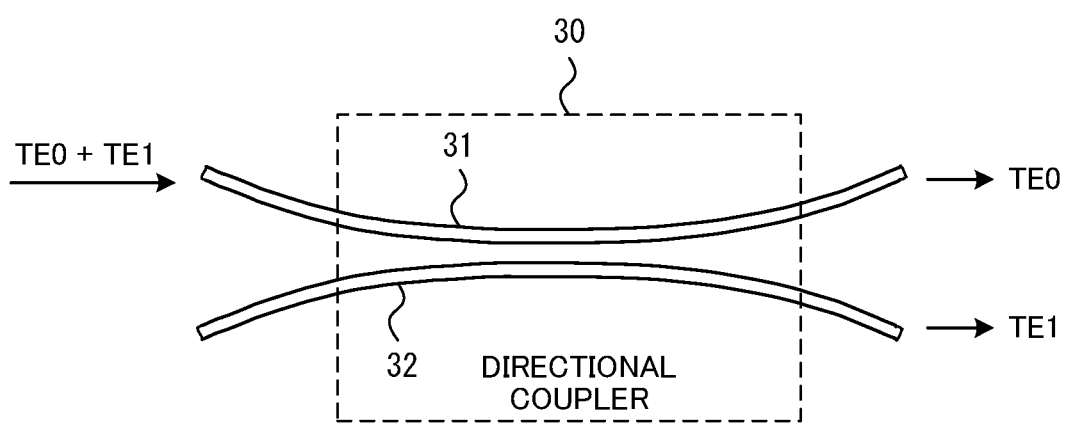
FIG. 4 illustrates an example of a higher-order mode removal mechanism.

FIG. 4 illustrates an example of the higher-order mode removal mechanism 13. In this example, the higher-order mode removal mechanism 13 is actualized a directional coupler 30. The directional coupler 30 includes two optical waveguides (main waveguide 31 and sub-waveguide 32). A distance between the main waveguide 31 and the sub-waveguide 32 and widths of the main waveguide 31 and sub-waveguide 32 are designed so that the TE1 mode is coupled between the main waveguide 31 and the sub-waveguide 32. In this case, when the TE0 mode light and TE1 mode light propagate via the main waveguide 31, the TE1 mode component is transferred from the main waveguide 31 to the sub-waveguide 32. In other words, the TE1 mode component is removed from the main waveguide 31.

However, in order to sufficiently remove the TE1 mode component, it is necessary to properly form the main waveguide 31 and the sub-waveguide 32. As one example, widths of the main waveguide 31 and the sub-waveguide 32 are required to be equal to each other. In other words, when the widths of the main waveguide 31 and the sub-waveguide 32 are different from each other due to manufacturing variations and the like, the TE1 mode component is not sufficiently transferred from the main waveguide 31 to the sub-waveguide 32, and remains in the main waveguide 31. Note that, this problem is caused by the configuration where the higher-order mode removal mechanism 13 is provided with two optical waveguides.

Figure 5:
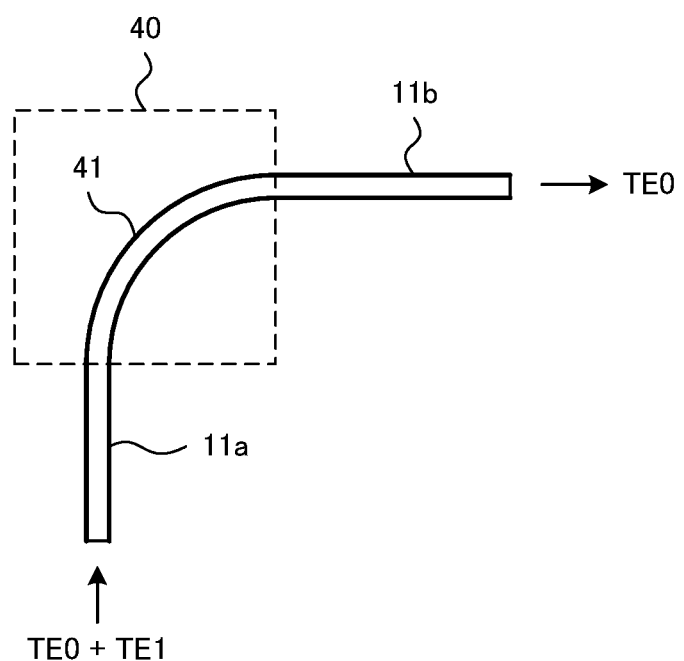
FIG. 5 illustrates another example of the higher-order mode removal mechanism.

FIG. 5 illustrates another example of the higher-order mode removal mechanism 13. In this example, the higher-order mode removal mechanism 13 is actualized by an optical waveguide device 40 including a curved waveguide 41. The input waveguide 11a is coupled to one end of the curved waveguide 41. Further, the output waveguide 11b is coupled to the other end of the curved waveguide 41. In other words, light input to the optical waveguide device 40 via the input waveguide propagates through the curved waveguide 41, and then, is output via the output waveguide 11b.

A shape of the curved waveguide 41 is an arc. In this embodiment, the curved waveguide 41 is actualized by forming an optical waveguide in an arc corresponding to one-fourth the circumference of a circle. The input waveguide 11a, curved waveguide 41 and output waveguide 11b may be integrally formed by the same manufacturing process. In other words, the curved waveguide 41 may be a part of one optical waveguide extending from the input end of the input waveguide 11a to the output end of the output waveguide 11b.

When light propagates through the optical waveguide, basic mode light is strongly confined within the core. In other words, as compared with the basic mode light, confinement of higher-order mode light is weak. Therefore, when light is input to the optical waveguide having a specified curvature, the basic mode light propagates, while being confined within the core, and the higher-order mode light is radiated outside the core. Accordingly, when the curved waveguide 41 is actualized with the arc-shaped optical waveguide having a specified curvature, it is possible to remove the higher-order mode component. In the example illustrated in FIG. 5, when. TE0 mode light and TE1 mode light are input via the input waveguide 11a, the TE1 mode component is removed in the curved waveguide 41, and the TE0 mode light is output via the output waveguide 11b.

Thus, the optical waveguide device 40 illustrated in FIG. 5 is capable of removing the higher-order mode component, by properly designing the curvature of the curved waveguide 41. Herein, as distinct from the configuration illustrated in FIG. 4, the optical waveguide device 40 is actualized with one optical waveguide. Therefore, even when the shape (particularly, width) of the optical waveguide deviates from the design value due to manufacturing variations and the like, the effect of removing the higher-order mode component hardly decreases.

However, the applicant of this application perceived that in the configuration illustrated in FIG. 5, there is a limit to the effect of removing the higher-order mode component. The applicant of this application found out that this phenomenon is caused by a mismatch of the electric field distribution occurring in a boundary between a linear waveguide and a curved waveguide.

In other words, in each of the boundary between the input waveguide 11a and the curved waveguide 41 and the boundary between the curved waveguide 41 and the output waveguide 11b, the curvature of the optical waveguide changes discontinuously in the propagation direction of light.

Specifically, each of the input waveguide 11a and output waveguide rib is a linear waveguide, and the curvature thereof is substantially zero. In contrast thereto, when the radius of the arc is R, the curvature of the curved waveguide 41 is 1/R. Then, in a configuration where the curvature of the optical waveguide changes discontinuously in the propagation direction of light, the mismatch of the electric field distribution occurs in the discontinuous point.

When the mismatch of the electric field.

distribution occurs, a part of power of basic mode light TE0 is converted into higher-order mode light (mainly, TE1). For example, it is assumed that a structure of the curved waveguide 41 is as described below.
Material of the core: Si
Material of the clad: SiO2
Thickness of the core: 0.22 μm
Width of the core: 0.48 μm
Radius R of the arc: 5 μm Further, it is assumed that a wavelength of input light is 1.5475 μm. In this case, −21.8 db of input TE0 mode light is converted into TE1 mode In other words, even when the higher-order mode component is sufficiently removed in the curved waveguide 41, −21.8 dB of the TE1 mode light is output. Accordingly, in the configuration illustrated in FIG. 5, there is a limit in removal efficiency of the higher-order mode component. In addition, since the TE1 mode light caused by the mismatch of the electric field distribution occurs in each optical waveguide device 40, even when a plurality of optical waveguide devices 40 are connected in series, the limit of the removal efficiency is not improved.

Embodiment

As described above, when the curvature of the optical waveguide changes discontinuously in the propagation direction of light, a part of power of the basic mode light is converted into the higher-order mode light. Therefore, a curved waveguide of an optical waveguide device according to the embodiment of the present invention is formed so that the curvature of a path extending from an input waveguide to an output waveguide via the curved waveguide changes continuously in the propagation direction of light.

Figure 6A:
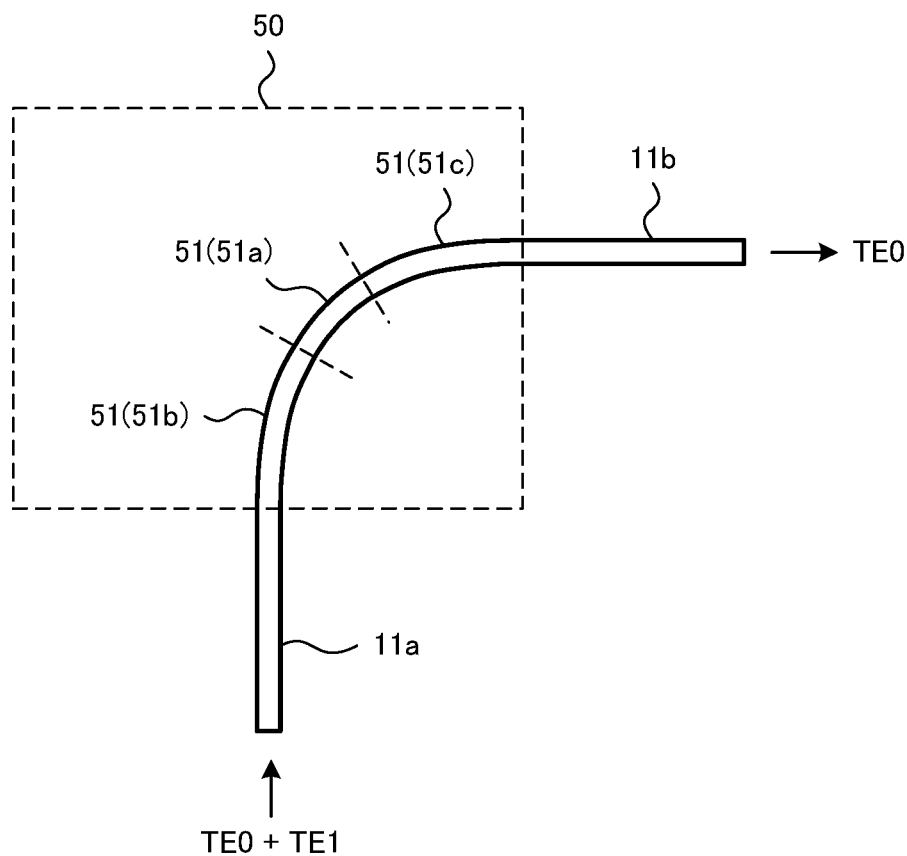
FIGS. 6A and 6B illustrate an example of a higher-order mode removal mechanism according to the embodiment of the present invention.
Figure 6B:
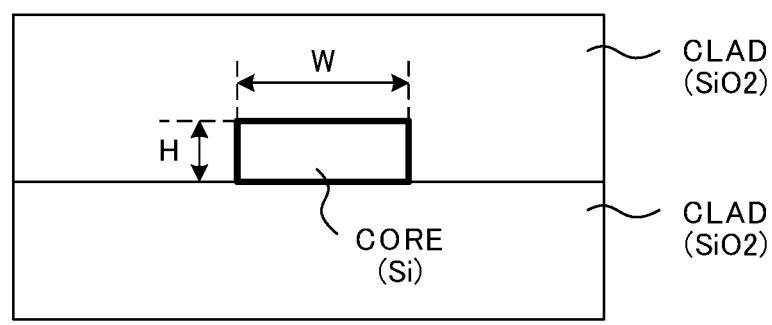

FIGS. 6A and 6B illustrate an example of a higher-order mode removal mechanism according to the embodiment of the present invention. In the embodiment of the invention, as illustrated in FIG. 6A, a higher-order mode removal mechanism 13 is actualized by an optical waveguide device 50 including a curved waveguide 51. As in the configuration illustrated in FIG. 5, the input waveguide 11a is coupled to one end of the curved waveguide 51. Further, the output waveguide 11b is coupled to the other end of the curved waveguide 51. In other words, light input to the optical waveguide device 50 via the input waveguide 11a propagates through the curved waveguide 51, and then, is output via the output waveguide 11b. Note that the input waveguide 11a propagates continuous light generated by a laser light source not illustrated in the figure. Alternatively, the input waveguide may propagate an optical signal generated inside the optical integrated circuit 1. Further, the input waveguide 11a may propagate an optical signal received by the optical integrated circuit 1.

FIG. 6B illustrates a structure of cross section of the curved waveguide 51. In this example, a core and clad of the curved waveguide 51 are respectively formed from Si and SiO2. Further, a thickness H and width W of the core are respectively 0.22 μm and 0.48 μm. In addition, structures of the cross section of the input waveguide 11a and output waveguide 11b are not limited particularly, and in this embodiment, both of the structures are the same as that of the curved waveguide 51. Further, the input waveguide 11a, curved waveguide 51 and output waveguide 11b may be formed integrally by the same manufacturing process. In other words, the curved waveguide 51 may be a part of one optical waveguide extending from the input end of the input waveguide to the output end of the output waveguide 11b.

As illustrated in FIG. 6A, the curved waveguide 51 is comprised of three waveguide portions. In other words, the curved waveguide 51 is comprised of an arc waveguide 51a, transition curve waveguide 51b and transition curve waveguide 51c. Note that the arc waveguide 51a, transition curve waveguide 51b and transition curve waveguide 51c may be formed integrally by the same manufacturing process.

A shape of the arc waveguide 51a is an arc with a radius R. Accordingly, the curvature of the arc waveguide 51a is 1/R. The arc waveguide 51a is provided between the transition curve waveguide 51b and the transition curve waveguide 51c. The transition curve waveguide 51b is provided between the input waveguide 11a and the arc waveguide 51a. The transition curve waveguide 51c provided between the arc waveguide 51a and the output waveguide 11b. In other words, the transition curve waveguide 51b, the arc waveguide 51a and the transition curve waveguide 51c are sequentially provided between the input waveguide 11a and the output waveguide 11b. When transition curve is provided between a straight line and an arc, the transition curve is realized by a curve such that the curvature thereof changes continuously between the curvature (i.e., zero) of the straight line and the curvature (herein, 1/R) of the arc. For example, the transition curve is actualized by a clothoid curve.

Accordingly, the curvature of an input end of the transition curve waveguide 51b is the same as that of the input waveguide 11a, and the curvature of an output end of the transition curve waveguide 51b is the same as that of the arc waveguide 51a. Herein, since the input waveguide 11a is a linear waveguide, the curvature of the input end of the transition curve waveguide 51b is zero. Further, the curvature of the output end of the transition curve waveguide 51b is 1/R. The curvature of the transition curve waveguide 51b changes continuously from zero to 1/R.

Similarly, the curvature of an input end of the transition curve waveguide 51c is the same as that of the arc waveguide 51a, and the curvature of an output end of the transition curve waveguide 51c is the same as that of the output waveguide 11b. Accordingly, the curvature of the input end of the transition curve waveguide 51c is 1/R. Further, since the output waveguide 11b is a linear waveguide, the curvature of the output end of the transition curve waveguide 51c is zero. The curvature of the transition curve waveguide 51c changes continuously from 1/R to zero.

The curved waveguide 51 is defined by two design parameters (R, A). Note that, in this embodiment, it is assumed that a length of the transition curve waveguide 51b is the same as a length of the transition curve waveguide 51c. In other words, the arc waveguide 51a is formed in the center of the curved waveguide 51. Further, in this embodiment, the input waveguide 11a and output waveguide 11b are orthogonal to each other. In other words, a bent angle of the curved waveguide 51 is 90 degrees. Furthermore, it is assumed that each of shapes of the transition curve waveguides 51b, 51c is the clothoid curve.

Figure 7A:
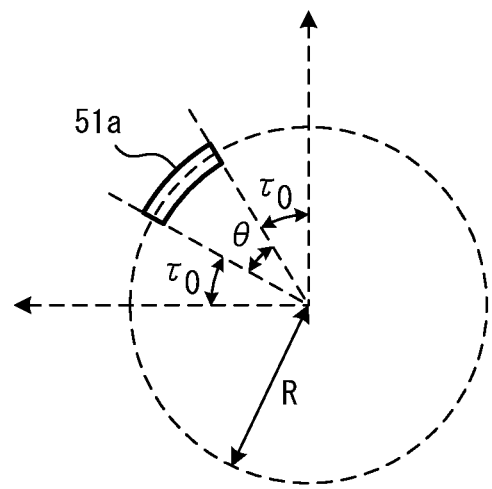
FIGS. 7A and 7B are diagrams to explain a clothoid curve.

In this case, the arc waveguide 51a is defined as illustrated in FIG. 7A. Here, the design parameter R indicates a radius of the arc waveguide 51a. An angle θ of the arc waveguide 51a is expressed by the following formula.

$$\theta = \frac{\pi}{2} - 2\tau_0$$

The design parameter A is expressed by the following formula.

$$\tau_0 = \frac{A^2}{2R^2}$$

Figure 7B:
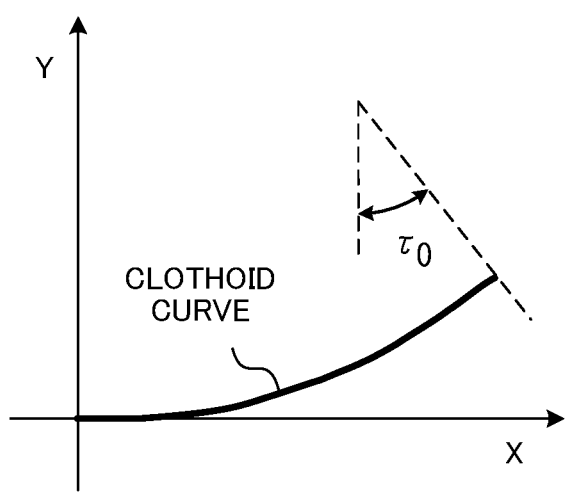

The clothoid curve P is expressed by the following formula, in the X-Y coordinate system illustrated in FIG. 7B.

$$P = (X, Y)$$
$$X = \frac{A}{\sqrt{2}} \int_0^\tau \frac{\cos(t)}{\sqrt{t}} dt$$
$$Y = \frac{A}{\sqrt{2}} \int_0^\tau \frac{\sin(t)}{\sqrt{t}} dt$$
$$0 \leq \tau \leq \tau_0$$

When a value of R is too large, the higher-order mode component is not removed in the curved waveguide 51. On the other hand, when the value of R is too small, there is the risk that the basic mode component is radiated outside the core in the curved waveguide 51. Accordingly, the radius R of the arc waveguide 51a is determined so that the higher-order mode component is sufficiently removed in the curved waveguide 51, and that the basic mode component is confined within the core. For example, in a communication system for transmitting optical signals using the C band (1530-1565 nm), the radius R of the arc waveguide 51a may be designed to be 3 μm to 5 μm by this means, it is possible to actualize the function of removing or suppressing the higher-order mode component of propagating light.

Further, when a value of A is decreased, τ0 is small, and therefore, the arc waveguide 51a is long. In contrast thereto, when the value of A is increased, τ0 is large, and therefore, the arc waveguide 51a is short. In other words, the design parameter A designates a length of the arc waveguide 51a. In addition, it is preferable that the design parameter A is determined by a simulation or measurement.

Figure 8:
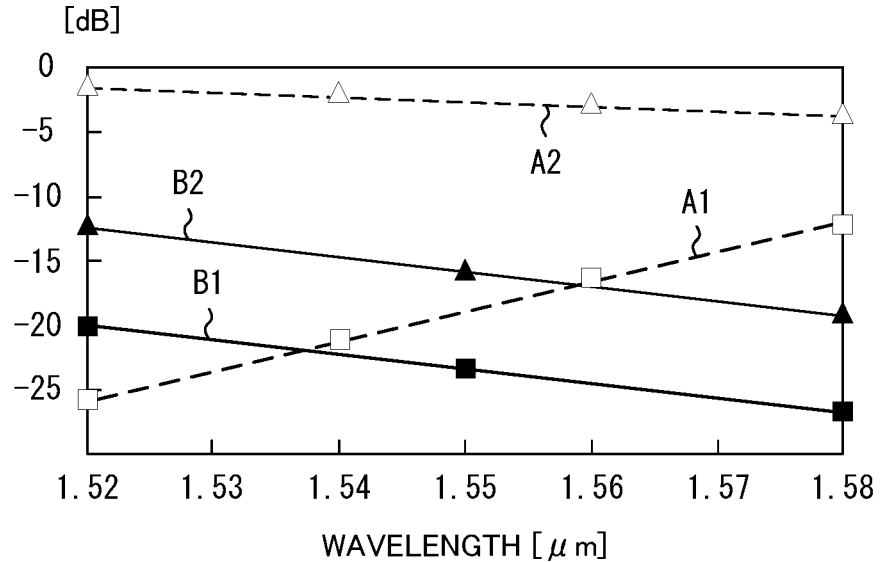
FIG. 8 illustrates an example of effects of the embodiment of the present invention.

FIG. 8 illustrates an example of effects of the embodiment of the present invention. The horizontal axis represents a wavelength of light passing through the higher-order mode removal mechanism 13. The vertical axis represents a quantity of the higher-order mode component remaining in output light of the higher-order mode removal mechanism 13.

Each of dashed lines A1 and A2 indicates a quantity of the residual higher-order mode component when the higher-order mode removal mechanism 13 is actualized by the directional coupler 30 illustrated in FIG. 4. The width and thickness of each optical waveguide constituting the directional coupler 30 are respectively 500 nm and 220 nm. Further, a distance between two optical waveguides is 500 nm. In "A1: with manufacturing variations", the width of one optical waveguide is 510 nm, and the width of the other optical waveguide is 490 nm.

In the case where the higher-order mode removal mechanism 13 is actualized by the directional coupler 30 illustrated in FIG. 4, when any manufacturing variation does not exist in the optical waveguide, as indicated by the dashed line A1, the higher-order mode component is sufficiently removed. However, when the manufacturing variation occurs in the optical waveguide, as indicated by the dashed line A2, the effect of removing the higher-order mode component is low. For example, when the wavelength of light passing through the directional coupler 30 is 1.52 nm, the residual higher-order mode component is about −1.2 dB.

Each of solid lines B1 and B2 indicates a quantity of the residual higher-order mode component when the higher-order mode removal mechanism 13 is actualized by the optical waveguide device 50 illustrated in FIG. 6A. In addition, in this example, the higher-order mode removal mechanism 13 is actualized by connecting two optical waveguide devices 50 illustrated in FIG. 6A in series. The width and thickness of the curved waveguide 51 constituting each optical waveguide device 50 are respectively 480 nm and 220 nm. Each of the design parameters R and A expressing the clothoid curve is 3 μm. In "B2: with manufacturing variations", errors of the width and thickness of the waveguide are respectively 25 nm and 10 nm.

In the case where the higher-order mode removal mechanism 13 is actualized by the optical waveguide device 50 illustrated in FIG. 6A, even when manufacturing variations occur in the optical waveguide, the higher-order mode component is sufficiently removed. For example, when the wavelength of light passing through the optical waveguide device 50 is 1.52 nm, as indicated by the solid line B2, the residual higher-order mode component is about −12 dB.

Thus, as distinct from the directional coupler illustrated in FIG. 4, the optical waveguide device 50 according to the embodiment of the present invention is comprised of one optical waveguide. Therefore, even in the case where the shapes (mainly, width) of the optical waveguide deviate from target values due to manufacturing variations and the like, it is possible to efficiently remove the higher-order mode component.

In addition thereto, in the optical waveguide device 50 according to the embodiment of the present invention, the curvature continuously changes in the path extending from the input waveguide 11a to the output waveguide 11b via the curved waveguide 51. Therefore, the mismatch of the electric field distribution is small in light propagating through the optical waveguide. As a result, conversion of the basic mode light into the higher-order mode light is suppressed in the optical waveguide device 50.

For example, it is assumed that a structure of the curved waveguide 51 is as described below.
Material of the core: Si
Material of the clad: SiO2
Thickness of the core: 0.22 μm
Width of the core: 0.48 μm
Radius R of the arc waveguide 51a: 5 μm
Angle of the arc waveguide 51a: 32.7 degrees
Parameter A of the clothoid curve: 5 μm
Length of the curved waveguide 51: 12.85 μm Further, it is assumed that a wavelength of input light is 1.5475 μm. In this case, losses of the TE0 mode light and TE1 mode light in the curved waveguide 51 are respectively 0.01 dB and 10.0 dB. Further, only −54.5 dB of input TFU mode light is converted into the TE1 mode light. In contrast thereto, in the optical waveguide device (i.e., optical waveguide device where the curved waveguide is comprised of only the arc waveguide) illustrated in FIG. 5, as described above, −28.1 dB of the input TE0 mode light is converted into the TE1 mode light. In other words, according to the embodiment of the present invention, generation of the higher-order mode light is suppressed.

Note that, as illustrated in FIG. 1, the higher-order mode light removal mechanism 13 may be provided on the input side of the optical device 12 in other words, the optical device 12 may be provided on the output side of the optical waveguide device 50 according to the embodiment of the present invention.

Figure 9A:
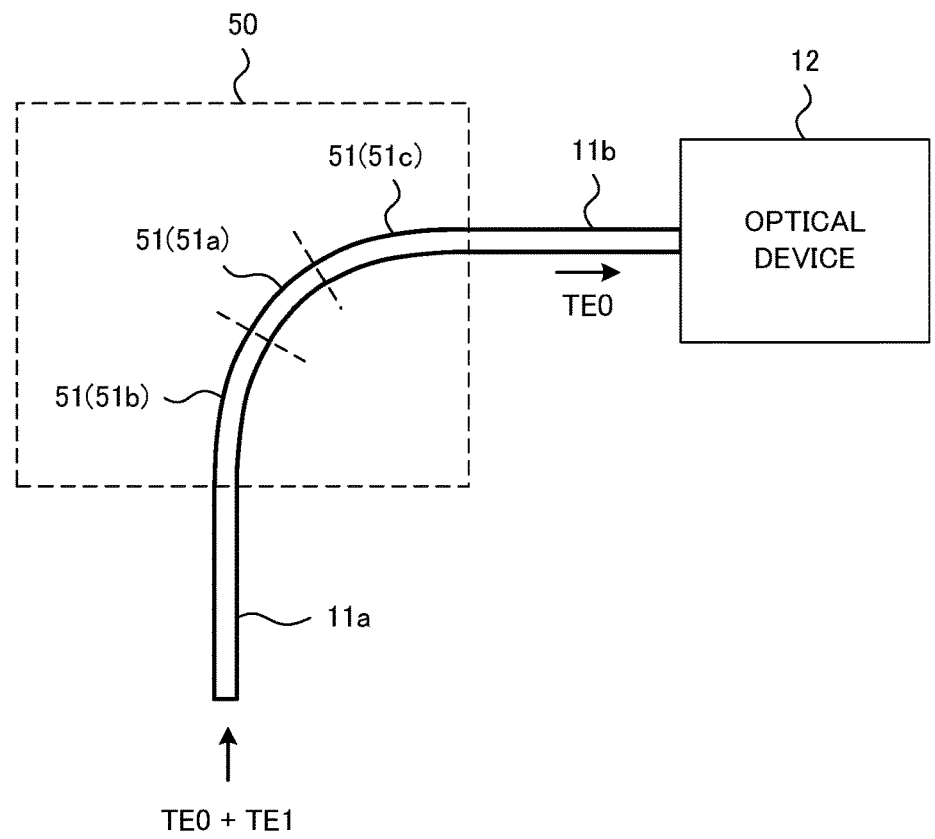
FIGS. 9A and 9B illustrate examples of the optical integrated circuit in which an optical device is installed on the output side of the higher-order mode removal mechanism.

For example, as illustrated in FIG. 9A, the optical device 12 is coupled to the optical waveguide 50 via the output waveguide 11b. Herein, when the optical waveguide is formed in the input end of the optical device 12, in a coupling point of the output waveguide lab and the optical waveguide of the optical device 12, it is preferable that the curvature of the output waveguide 11b and the curvature of the optical waveguide of the optical device 12 are the same as each other.

Figure 9B:
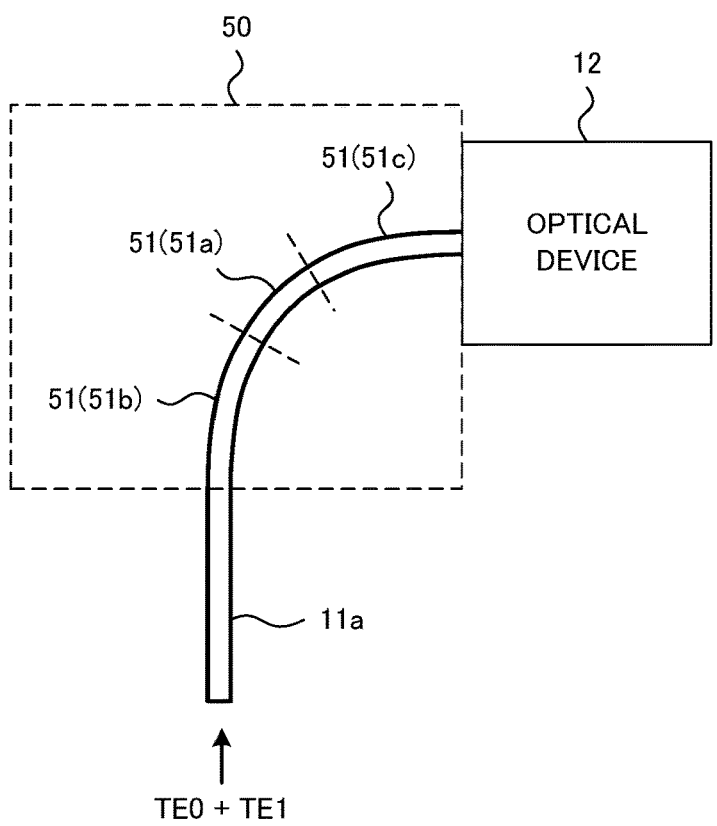

Further, as illustrated in FIG. 9B, the optical device 12 may be directly coupled to the curved waveguide 51 constituting the optical waveguide device 50. In this case, in a coupling point of the curved wave-guide 51 and the optical waveguide of the optical device 12, it is preferable that the curvature of the curved waveguide 51 and the curvature of the optical waveguide of the optical device 12 are the same as each other.

The optical device 12 may be an optical splitter for branching input light at a specified power ratio. In this case, the optical splitter may be actualized by a 1×2 coupler or 2×2 coupler. The 1×2 coupler may be actualized by a 1×2 MMI (Multi-Mode Interference) optical waveguide or F-branch optical waveguide. Here, when the higher-order mode light is mixed into input light of the optical splitter, as explained with reference to FIGS. 2A and 2B, the branch ratio deviates from the target value. Then, the optical integrated circuit 1 of the present invention is provided with the optical waveguide device 50 on the input side of the optical splitter. According to this configuration, the higher-order mode component is removed from the input light of the optical splitter. Therefore, the optical splitter can branch the input light at the specified branch ratio.

Further, the optical device 12 may be the tapered waveguide illustrated in FIG. 3A. Herein, when. TE1 mode light is input to the tapered wave-guide illustrated in FIG. 3A, TM0 mode light may be generated. Thus, the optical integrated circuit 1 of the present invention maybe provided with the optical waveguide device 50 on the input side of the tapered waveguide. According to this configuration, generation of the TM0 mode light is suppressed in the tapered waveguide. Therefore, in optical communication for performing polarization multiplexing using TE0 and TM0, crosstalk between polarization is suppressed.

Variation

Figure 10A:
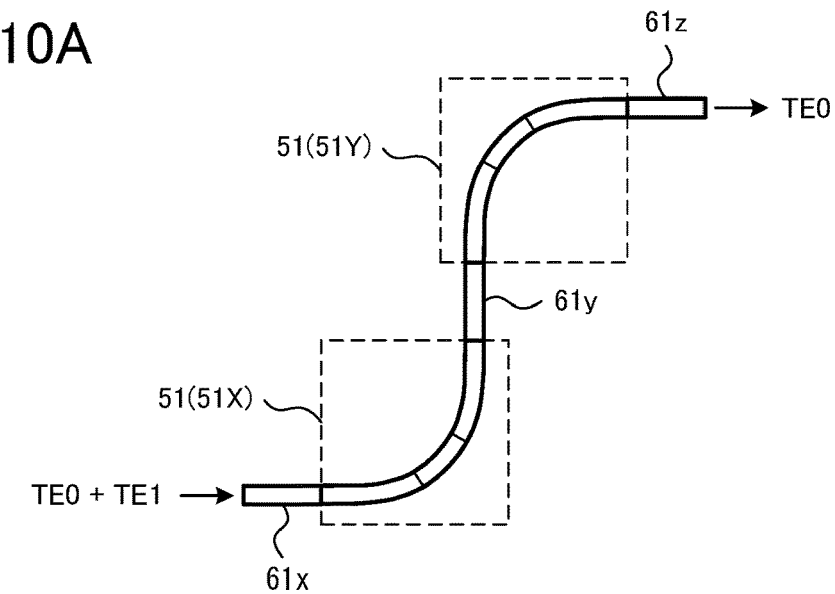
FIGS. 10A-10C illustrate variations of the embodiment of the present invention.
Figure 10B:
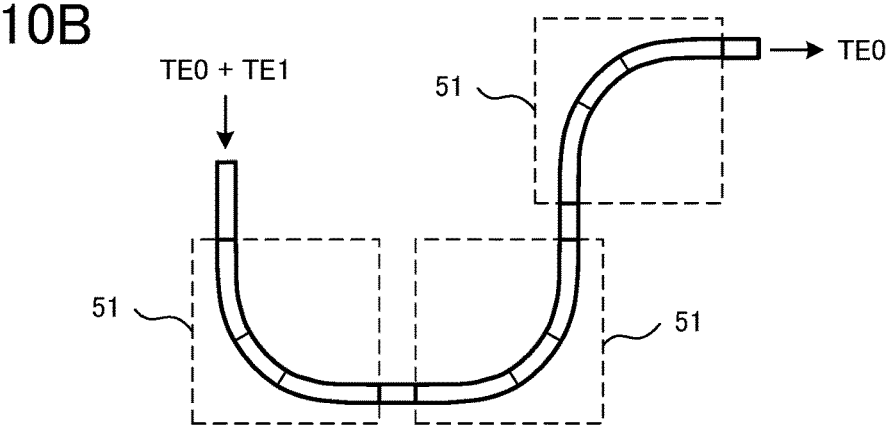
Figure 10C:
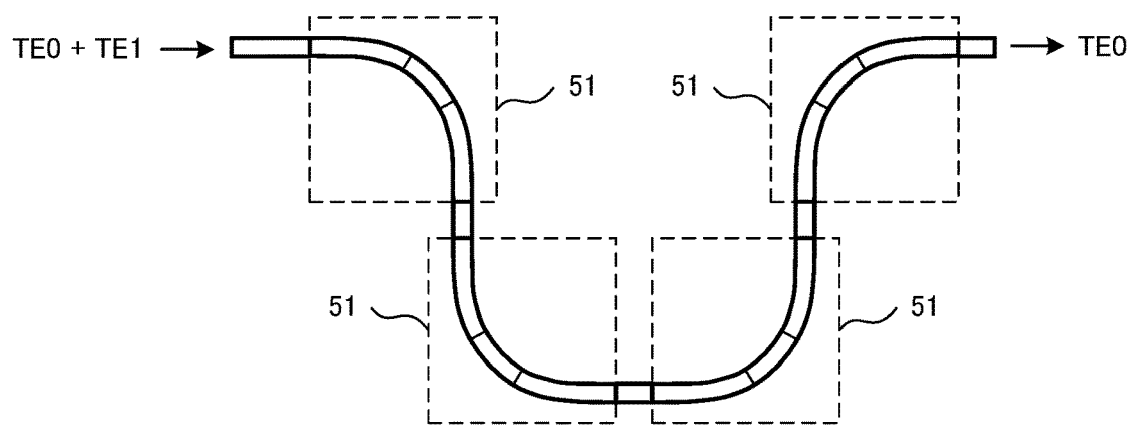

FIGS. 10A-10C illustrate variations of the embodiment of the present invention. Note that, in the embodiment illustrated in FIG. 6A, the optical waveguide device 50 is provided with one curved waveguide 51, and may be provided with a plurality of curved waveguides 51.

in an example illustrated in FIG. 10A, the optical waveguide device that works as the higher-order mode removal mechanism 13 is provided with two curved waveguides 51. In an example illustrated in FIG. 10C, the optical waveguide device is provided with three curved waveguides 51. In an example illustrated in FIG. 10C, the optical waveguide device is provided with four curved waveguides 51. When the optical waveguide device is provided with a plurality of curved waveguides 51, the plurality of curved waveguides 51 are connected in series. Further, the curved waveguide 51 and the curved waveguide 51 may be coupled with a linear waveguide.

In a configuration illustrated in FIG. 10A, waveguide 61x is coupled to one end of a curved waveguide 51X, and a waveguide 61y is coupled to the other end of the curved waveguide 51X. The waveguide 61y is coupled to one end of a curved waveguide 51Y, and a waveguide 61z is coupled to the other end of the curved waveguide 51Y. In other words, when the optical waveguide device 50 is provided with the curved waveguides 51X, 51Y, the waveguide 61x and waveguide 61z are respectively used as an input waveguide and output waveguide. The waveguides 61x, 61y and 61z are not limited particularly, and are linear waveguides in this embodiment.

The waveguide 61x and waveguide 61y are respectively used as the input waveguide and output waveguide for the curved waveguide 51K. Similarly, the waveguide 61y and waveguide 61z are respectively used as the input waveguide and output waveguide for the curved waveguide 51Y. Further, an angle of each curved waveguide 51 (51K, 51Y) is 90 degrees in this embodiment. In this case, a direction of light propagating via the waveguide 61x and a direction of light propagating via the waveguide 61y are orthogonal to each other, and the direction of light propagating via the waveguide 61y and a direction of light propagating via the waveguide 61z are orthogonal to each other.

The higher-order mode component is removed in each curved waveguide 51. Herein, power of light converted from the basic mode into the higher-order mode is adequately small in each curved waveguide 51. Accordingly, by increasing the number of curved waveguides 51, it is possible to reduce the higher-order mode component to a desired level. Further, by connecting a plurality of curved waveguides 51, it is possible to guide input light in a desired direction. For example, in the configuration illustrated in FIG. 10A or 10C, a propagation direction or output light is the same as that of input light. In a configuration illustrated in FIG. 10B, a propagation direction of output light is a direction orthogonal to input light.

Figure 11:
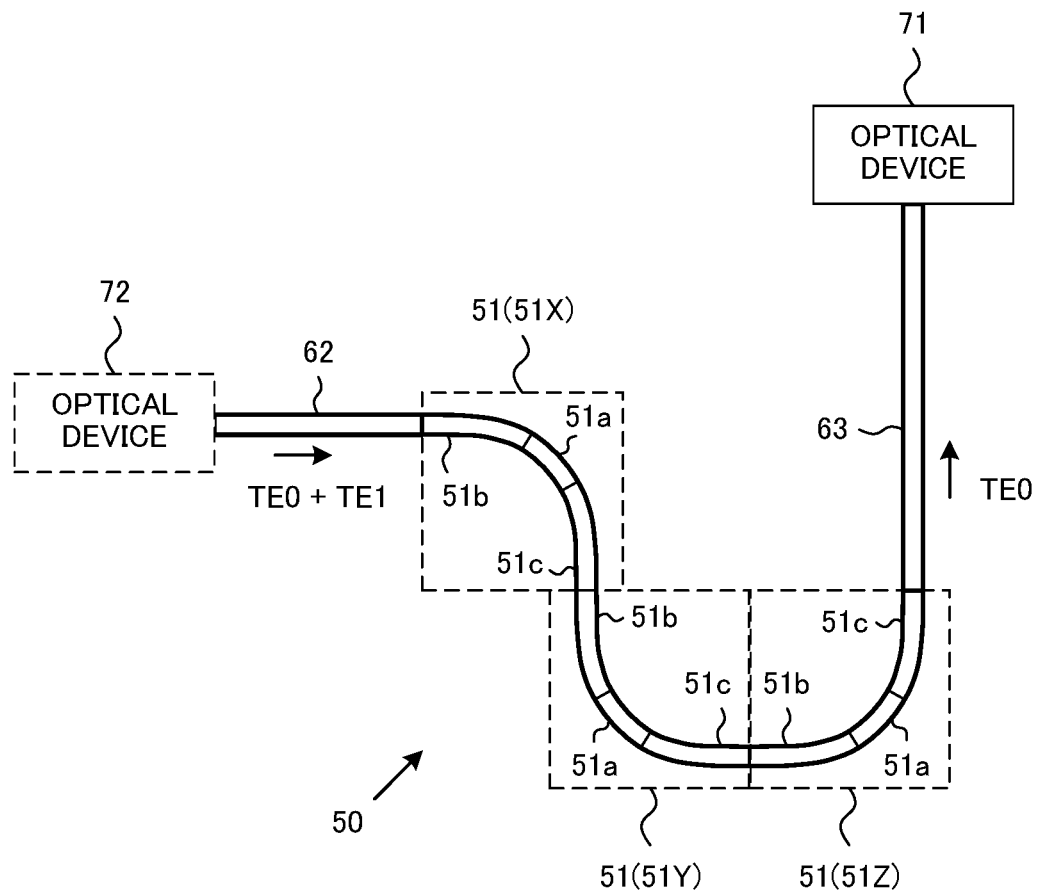
FIG. 11 illustrates another variation of the embodiment of the present invention.

FIG. 11 illustrates another variation of the embodiment of the present invention. Also in this variation, the optical waveguide device 50 is provided with a plurality of curved waveguides 51.

In an example illustrated in FIG. 11, the optical waveguide device 50 is provided with three curved waveguides 51 (51X to 51Z). Configurations of the curved waveguide, 51X to 51Z are substantially the same as each other. In other words, as in the curved waveguide 51 illustrated in FIG. 6A, each of the curved waveguides 51X to 51Z is comprised of the arc waveguide 51*a* and transition curve waveguides 51*b* and 51*c*. Further, the curved waveguides 51Y to 51Z are coupled in series.

The transition curve waveguide 51*b* formed in one end of each curved waveguide 51 is coupled to the transition curve waveguide 51*c* formed in the other end of the adjacent curved waveguide 51. Specifically, the transition curve waveguide 51*b* of curved waveguide 51Y is coupled to the transition curve waveguide 51*c* of the curved waveguide 51X, and the transition curve waveguide 51*b* of curved waveguide 51Z is coupled to the transition curve waveguide 51*c* of the curved waveguide 51Y. In this case, in a coupling point of the transition curve waveguide 51*b* and the transition curve waveguide 51*c*, the curvature of the transition curve waveguide 51*b* and the curvature of the transition curve waveguide 51*c* are equal to each other. In this embodiment, in the coupling point of the transition curve waveguide 51*b* and the transition curve waveguide 51*c*, each of the curvature of the transition curve waveguide 51*b* and the curvature of the transition curve waveguide 51*c* is zero.

The transition curve waveguide 51*b* of the curved waveguide 51 (herein, curved wave-guide 51X), that is provided in one end among three curved waveguides 51 connected in series, is coupled to a waveguide 62. In this case, in a coupling point of the transition curve waveguide 51*b* and the waveguide 62, the curvature of the transition curve waveguide 51*b* and the curvature of the waveguide 62 are equal to each other in this embodiment, the waveguide 62 is a linear waveguide, and in the coupling point of the transition curve waveguide 51*b* and the waveguide 62, each of the curvature of the transition curve waveguide 51*b* and the curvature of the waveguide 62 is zero.

The transition curve waveguide 51*c* of the curved waveguide 51 (herein, curved wave-guide 51Z), that is provided in the other end among three curved waveguides 51 connected in series, is coupled to a waveguide 63. In this case, in a coupling point of the transition curve waveguide 51*c* and the waveguide 63, toe curvature of the transition curve waveguide 51*c* and the curvature of the waveguide 63 are equal to each other. In this embodiment, the waveguide 63 is a linear waveguide and in the coupling point of the transition curve waveguide 51*c* and the waveguide 63, each of the curvature of the transition curve waveguide 51*c* and the curvature of the waveguide 63 is zero.

The optical waveguide device 50 illustrated FIG. 11 may be provided on the input side of an optical device 71. In this case, for example, the optical device 71 may be the optical coupler/optical splitter illustrated in FIG. 2A, or may be the tapered waveguide illustrated in FIG. 3A. In an example illustrated in FIG. 11, the optical waveguide device 50 is coupled to the optical device 71 via the waveguide 63, but the waveguide 63 may not be provided between the optical waveguide device 50 and the optical device 71. In other words, the optical device 71 may be directly coupled to the transition curve waveguide 51*c* of the curved waveguide 51Z.

Similarly, an optical device 72 may be provided in an end of the waveguide 62. In other words, the optical integrated circuit may be a configuration provided with a plurality of curved waveguides 51 between two optical devices (71, 72). In addition, in the example illustrated in FIG. 11, three curved waveguide are provided between the optical devices, and it is possible to provide any number of curved waveguides 51 between the optical devices.

As described above, in the embodiments illustrated in FIGS. 10A-10C and FIG. 11, the optical waveguide device 50 provided with a plurality of curved waveguides 51 coupled in series. Herein, in the embodiment of the present invention, the curvature of the waveguide continuously changes inside the optical waveguide device 50, and the curvature continuously changes also in the coupling point of the optical waveguide device 50 and the waveguide coupled to the optical waveguide device 50. Accordingly, the higher-order mode component does not substantially occur when light passes through the optical waveguide device 50. On the other hand, the higher-order mode component is removed in each curved waveguide 51. Accordingly, by increasing the number of stages of curved waveguides 51, it is possible to reduce the higher-order mode component to a desired level.

Further, in the embodiment illustrated in FIG. 6A, the curved waveguide 51 is comprised of the arc waveguide 51*a* and transition curve waveguides 51*b* and 51*c*, and the arc waveguide 51*a* is provided in the center of the curved waveguide 51. In other words, the lengths of the transition curve waveguides 51*b* and 51*c* are the same as each other. However, the embodiment of the present invention is not limited to this configuration. In other words, the arc waveguide 51*a* may be provided in a position shifted from the center of the curved waveguide 51. In this case, the lengths of the transition curve waveguides 51*b* and 51*c* are different from each other.

Furthermore, in the embodiment illustrated in FIG. 6A, light is input to the optical waveguide device 50 via the waveguide 11*a*, and the light passing through the optical waveguide device 50 is output via the waveguide 11*b*, but the embodiment of the present invention is not limited to this configuration. Specifically, light may be input to the optical waveguide device 50 via the waveguide 11*b*, and the light passing through the optical waveguide device 50 may be output via the waveguide 11*a*. In other words, the optical waveguide device 50 can remove the higher-order mode component from light propagating in either direction via the curved waveguide 51.

In the embodiment illustrated in FIG. 6A, the bent angle of the curved waveguide 51 is 90 degrees, but the embodiment of the present invention is not limited to this configuration. In other words, the bent angle of the arc waveguide 51*a* may be larger than 90 degrees, or may be smaller than 90 degrees.

The curved waveguide 51 may be comprised of a multi-mode waveguide through which the basic mode light and higher-order mode light can be propagated. In this case, the propagation loss is small. However, the curved waveguide 51 may be a single mode waveguide through which only the basic mode light can be propagated. In this case, the multi-mode waveguide through which the basic mode light and higher-order mode light can be propagated may be connected to the input side of the curved waveguide 51.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical waveguide device having a function of removing or suppressing a higher-order none component of propagating light, the optical waveguide device comprising:
   a curved waveguide having a curved shape where curvature continuously changes, wherein
   a first waveguide is coupled to one end of the curved waveguide,
   a second waveguide is coupled to the other end of the curved waveguide,
   a curvature of the first waveguide and the curvature of the curved waveguide are equal to each other in a coupling point in which the first waveguide is coupled to the curved waveguide, and
   a curvature of the second waveguide and the curvature of the curved waveguide are equal to each other in a coupling point in which the second waveguide is coupled to the curved waveguide.

2. The optical waveguide device according to claim 1, wherein
   the curvature of the curved waveguide is zero in the coupling point in which the first waveguide is coupled to the curved waveguide, and
   the curvature of the curved waveguide is zero in the coupling point in which the second waveguide is coupled to the curved waveguide.

3. The optical waveguide device according to claim 1, wherein
   the curved waveguide includes a first transition curve waveguide coupled to the first waveguide, a second transition curve waveguide coupled to the second waveguide, and an arc waveguide formed between the first transition curve waveguide and the second transition curve waveguide.

4. The optical waveguide device according to claim 3, wherein
   a curvature of the first transition curve waveguide and a curvature of the arc waveguide are equal to each other in a coupling point in which the first transition curve waveguide is coupled to the arc waveguide, and
   a curvature of the second transition curve waveguide and the curvature of the arc waveguide are equal to each other in a coupling point in which the second transition curve waveguide is coupled to the arc waveguide.

5. The optical waveguide device according to claim 1, wherein
   the curved waveguide is a multi-mode waveguide through which basic mode light and higher-order mode light propagate.

6. The optical waveguide device according to claim 1, wherein
   the curved waveguide is a single mode waveguide though which only basic mode light propagates.

7. The optical waveguide device according to claim 1, further comprising:
   a second curved waveguide having a curved shape where a curvature continuously changes, wherein the second waveguide is coupled to one end of the second curved waveguide, a third waveguide is coupled to the other end of the second curved waveguide, the curvature of the second waveguide and the curvature of the second curved waveguide are equal to each other in a coupling point in which the second waveguide is coupled to the second curved waveguide, and a curvature of the third waveguide and the curvature of the second curved waveguide are equal to each other in a coupling point which the third waveguide coupled to the second curved waveguide.

8. The optical waveguide device according to claim 7, wherein a direction in which light propagates via the first waveguide is orthogonal to a direction in which the light propagates via the second waveguide, and the direction in which the light propagates via the second waveguide is orthogonal to a direction in which the light propagates via the third waveguide.

9. An optical waveguide device having a function of removing or suppressing a higher-order mode component of propagating light, the optical waveguide device comprising:

a curved waveguide having a curved shape where curvature continuously changes, wherein an input waveguide is coupled to one end of the curved waveguide, an optical device is coupled to the other end of the curved waveguide, and a curvature of the input waveguide and the curvature of the curved waveguide are equal to each other in a coupling point in which the input waveguide is coupled to the curved waveguide.

10. An optical waveguide device having a function of removing or suppressing a higher-order mode component of propagating Light, the optical waveguide device comprising:

N curved waveguides coupled in series, N being an integer larger than one, wherein each of the curve waveguides has a curved shape where a curvature continuous changes, a first waveguide is coupled to one end of a first curved waveguide among the N curved waveguides, the curvature of the first curved waveguide and a curvature of the first waveguide are equal to each other the one end of the first curved waveguide, one end of an ith (1<i≤N) curved waveguide among the N curved waveguides is coupled to the other end of an i-1th curved waveguide among the N curved waveguides, and the curvature of the i-1th curved waveguide and the curvature of the i-1th curved waveguide are equal to each other in a coupling point in which the ith curved waveguide is coupled to the i-1th curved waveguide.

11. The optical waveguide device according to claim 10, wherein a second waveguide is coupled to the other end of an Nth curved waveguide among the N curved waveguides, and the curvature of the Nth curved waveguide and curvature of the second waveguide are equal to each other at the other end of the Nth curved waveguide.

12. The optical waveguide device according to claim 10, wherein an optical device is coupled to the other end of the Nth curved way guide.

13. The optical waveguide device according claim 10, wherein the one end of the ith curved waveguide is coupled to the other end of the i-1th curved waveguide via a linear waveguide.

14. An optical integrated circuit comprising:

a first waveguide;

a curved waveguide coupled to the first waveguide and configured to have a function of removing or suppressing a higher-order mode component of propagating light;

a second waveguide coupled to the curved waveguide; and an optical device coupled to the second waveguide, wherein a curvature of the first waveguide and a curvature of the curved waveguide are equal to each other in a coupling point in which the first waveguide is coupled to the curved waveguide, and a curvature of the second waveguide and the curvature of the curved waveguide are equal to each other in a coupling point in which the second waveguide is coupled to the curved waveguide.

15. The optical integrated circuit according to claim 14, wherein the optical device is a 1×2 optical coupler or a 2×2 optical coupler.

16. The optical integrated circuit according to claim 14, wherein the optical device is a tapered waveguide where a width of a core continuously changes in a propagation direction of the light, a cross-sectional shape of the tapered waveguide is asymmetry in a direction perpendicular to a substrate with the tapered waveguide formed, and when a first effective refractive index indicative of an effective refractive index of a TE0 mode is larger than a second effective refractive index indicative of an effective refractive index of a TEm (m≥1) mode in an input end of the tapered waveguide, the first effective refractive index is smaller than the second effective refractive index in an output end of the tapered waveguide, and when the first effective refractive index is smaller than the second effective refractive index the input end, the first effective refractive index is larger than the second effective refractive index in the output end.

17. An optical integrated circuit comprising:

an input waveguide;

a curved waveguide coupled to the input waveguide and configured to have a function of removing or suppressing a higher-order mode component of propagating light; and an optical device coupled to the curved waveguide, wherein a curvature of the input waveguide and a curvature of the curved waveguide are equal to each other in a coupling point in which the input waveguide is coupled to the curved waveguide.

18. An optical integrated circuit comprising:

a first optical device;

a second optical device;

a first curved waveguide provided between the first optical device and the second optical device and configured to have a function of removing or suppressing a higher-order mode component of propagating light; and a second curved waveguide provided between the first optical device and the second optical device and configured to have the function of removing or suppressing the higher-order mode component of propagating light, wherein the first curved waveguide and the second curved waveguide are coupled in series between the first optical device and the second optical device, each of the first curved waveguide and the second curved waveguide has a curved shape where a curvature continuously changes, a first waveguide is coupled to one end of the first curved waveguide, the curvature of the first curved waveguide and a curvature of the first waveguide are equal to each other in a coupling point in which the first curved waveguide is coupled to the first waveguide, the curvature of the first curved waveguide and the curvature of the second curved waveguide are equal to each other in a coupling point in which the other end of the first curved waveguide is coupled to one end of the second curved waveguide, a second waveguide is coupled to the other end of the second curved waveguide, and the curvature of the second curved waveguide and a curvature of the second waveguide are equal to each other is a coupling point in which the second curved waveguide is coupled to the second waveguide.

* * * * *